(12) United States Patent
Das et al.

(10) Patent No.: US 11,417,124 B2
(45) Date of Patent: Aug. 16, 2022

(54) SYSTEM FOR REAL-TIME AUTOMATED SEGMENTATION AND RECOGNITION OF VEHICLE'S LICENSE PLATES CHARACTERS FROM VEHICLE'S IMAGE AND A METHOD THEREOF

(71) Applicant: VIDEONETICS TECHNOLOGY PRIVATE LIMITED, Kolkata (IN)

(72) Inventors: Sudeb Das, Asansol (IN); Apurba Gorai, Dhaka (IN); Tinku Acharya, Baishnabghata Patuli Township (IN)

(73) Assignee: VIDEONETICS TECHNOLOGY PRIVATE LIMITED, Kolkata (IN)

( * ) Notice: Subject to any disclaimer, the term of this patent is extended or adjusted under 35 U.S.C. 154(b) by 22 days.

(21) Appl. No.: 16/976,046

(22) PCT Filed: Feb. 25, 2019

(86) PCT No.: PCT/IN2019/050150
§ 371 (c)(1),
(2) Date: Aug. 26, 2020

(87) PCT Pub. No.: WO2019/162970
PCT Pub. Date: Aug. 29, 2019

(65) Prior Publication Data
US 2020/0401834 A1    Dec. 24, 2020

(30) Foreign Application Priority Data
Feb. 26, 2018   (IN) .............................. 201831007206

(51) Int. Cl.
*G06V 20/62*     (2022.01)
*G06V 10/28*     (2022.01)
(Continued)

(52) U.S. Cl.
CPC ............ *G06V 20/625* (2022.01); *G06T 3/608* (2013.01); *G06T 7/11* (2017.01); *G06T 7/136* (2017.01);
(Continued)

(58) Field of Classification Search
None
See application file for complete search history.

(56) References Cited

U.S. PATENT DOCUMENTS 4,850,025 A    7/1989  Abe
5,136,658 A    8/1992  Mori
(Continued)

OTHER PUBLICATIONS

T. Hong and A. K. Gopalakrishnam, "License plate extraction and recognition of a Thai vehicle based on MSER and BPNN," 2015 7th International Conference on Knowledge and Smart Technology (KST), 2015, pp. 48-53, doi: 10.1109/KST.2015.7051457. (Year: 2015).*

(Continued)

*Primary Examiner* — Emily C Terrell
*Assistant Examiner* — Nathan J Bloom
(74) *Attorney, Agent, or Firm* — Masuvalley & Partners

(57) ABSTRACT

The present invention discloses a system for automated vehicles license plates characters segmentation and recognition comprising an imaging processor connected to at least one image grabber module or camera. The image grabber module captures images of the vehicles and forwards it to said connected imaging processor and the imaging processor segments and recognizes the vehicles license plates character region including the region with deformed license plates characters in the captured vehicle images by involving binarization of maximally stable external regions corresponding to probable license plate region in the captured vehicle images.

7 Claims, 5 Drawing Sheets

(51) Int. Cl.
*G06V 10/30* (2022.01)
*G06V 10/26* (2022.01)
*G06V 30/146* (2022.01)
*G06T 7/136* (2017.01)
*G06T 7/11* (2017.01)
*G06T 7/155* (2017.01)
*G06T 3/60* (2006.01)

(52) U.S. Cl.
CPC ............ *G06T 7/155* (2017.01); *G06V 10/273* (2022.01); *G06V 10/28* (2022.01); *G06V 10/30* (2022.01); *G06V 20/63* (2022.01); *G06V 30/1478* (2022.01); *G06T 2207/30248* (2013.01); *G06T 2207/30252* (2013.01)

(56) References Cited

U.S. PATENT DOCUMENTS

| | | | |
|---|---|---|---|
| 6,339,651 | B1 | 1/2002 | Tian et al. |
| 9,292,759 | B2 | 3/2016 | Burry et al. |
| 9,405,985 | B1 | 8/2016 | Burry et al. |
| 9,405,988 | B2 | 8/2016 | Alves |
| 9,501,707 | B2 | 11/2016 | Bulan et al. |
| 9,858,477 | B2 | 1/2018 | Nakamura |
| 9,858,493 | B2 | 1/2018 | Tseng |
| 9,870,520 | B1 | 1/2018 | Becker et al. |
| 2015/0193667 | A1* | 7/2015 | Acharya .................. G06T 7/10 382/165 |
| 2016/0098589 | A1* | 4/2016 | Brieu ................... G06K 9/4652 382/128 |
| 2016/0299897 | A1 | 10/2016 | Silva et al. |
| 2017/0147893 | A1 | 5/2017 | Wilbert et al. |
| 2018/0005058 | A1 | 1/2018 | Yang |
| 2018/0012101 | A1 | 1/2018 | Mizes et al. |
| 2018/0189566 | A1* | 7/2018 | Grimm ................ G06K 9/4614 |
| 2018/0300578 | A1* | 10/2018 | Wilbert .............. G06K 9/00671 |

OTHER PUBLICATIONS

Matas J, Zimmermann K. Unconstrained licence plate and text localization and recognition. InProceedings. 2005 IEEE Intelligent Transportation Systems, 2005. Sep. 16, 2005 (pp. 225-230). IEEE. (Year: 2005).*

Y. Li, D. Niu, X. Chen, T. Li, Q. Li and Y. Xue, "Vehicle License Plate Recognition Combing MSER and Support Vector Machine in a Complex Environment," 2019 Chinese Control Conference (CCC), 2019, pp. 7045-7050, doi: 10.23919/ChiCC.2019.8865171. (Year: 2019).*

M. S. Al-Shemarry., "Ensemble of Adaboost cascades of 3L-LBPs classifiers for license plates detection with low quality images" Expert Systems with Application., 2018, 20 pages.

J. Wang et al., "An effective method for plate No. recognition" Multimed. Tools Appl., 2017, 14 pages.

R. Panahi et al., "Accurate Detection and Recognition of Dirty Vehicle Plate Nos. for High-Speed Applications," IEEE Transaction on Intelligent Transportation Systems, vol. 18, No. 4, Apr. 2017, 13 pages.

B. Su et al., "Accurate recgonition of words in scenes without character segmentation using recurrent neural network" Pattern Recognition, 2017, 9 pages.

A. Safaei et al., "Real-time search-free multiple license plate recognition via likelihood estimation of saliency" Computers and Electrical Engineering, 2016, 15 pages.

C. Gau et al., "Vehicle License Plate Recognition Based on Extremal Regions and Restricted Boltzmann Machines," IEEE Transactions on Intelligent Transportation Systems, 2015, 12 pages.

J. Matas et al. "Robust wide baseline stereo from maximally stable external regions2008" Proc. of British Machine Vision Conference, 2002, 7 pages.

WIPO, U.S. International Search Authority, International Search Report and Written Opinion dated Jun. 28, 2019 in International Patent Application No. PCT/IN2019/050150, 6 pages.

* cited by examiner

SYSTEM FOR REAL-TIME AUTOMATED SEGMENTATION AND RECOGNITION OF VEHICLE'S LICENSE PLATES CHARACTERS FROM VEHICLE'S IMAGE AND A METHOD THEREOF

RELATED APPLICATIONS

This application is the U.S. National Phase of and claims priority to International Patent Application No. PCT/IN2019/050150, International Filing Date Feb. 25, 2019, entitled A System For Real-Time Automated Segmentation And Recognition Of Vehicle's License Plates Characters From Vehicle's Image And A Method Thereof which claims benefit of Indian Application No. 201831007206 filed Feb. 26, 2018 entitled A System For Real-Time Automated Segmentation And Recognition Of Vehicle's License Plates Characters From Vehicle's Image And A Method Thereof both of which are incorporated herein by reference in their entireties.

FIELD OF THE INVENTION

The present invention relates to generic license plate character segmentation and recognition. More specifically, the present invention is directed to develop a system and a method for real-time automatic segmentation and recognition of license plates characters of a vehicle by analysis of images of the vehicle.

BACKGROUND OF THE INVENTION

Development of computationally efficient and robust automatic license plate recognition (ALPR) system that is equally effective in different countries is a challenging task. A generic ALPR system should be invariant to the background and foreground colors of the License plates (LPs) and should be independent of the scripts and fonts used to write the alpha-numeric characters in the LP. State-of-the-art ALPR systems often work efficiently for a specific type of LP corresponding to a specific country or a group of selected countries. In most of the cases existing ALPR systems are dependent on the dimension and shape of the LPs specific to a specific country. Moreover, the script and fonts of alpha-numeric characters and symbols used in LPs throughout the world are different—which causes problem for many existing ALPR systems to work efficiently without any modification in the system configuration. Furthermore, LPs often have different foreground-background color combinations and many countries also have multi-colored as well as multi-textured LPs. The popular techniques of image thresholding/binarization, edge detection based LP recognition schemes often fail in these different situations.

The existing techniques of LP's character segmentation are often ineffective for multi-colored, multi-textured LPs without special consideration of the jurisdiction and templates of license plates. Image thresholding method based on single level binarization often fails to segment all the characters in the textual region properly. This is due to the fact that in cases where two LPs have opposite foreground (characters) and background (plate) colors, single level thresholding schemes produce opposite binarize images in those cases. In one binarize image foreground (characters) will be of white and the background will be of black. The negative binarize image will be produced for the other LP image. Because the foreground (characters) will be of two different (opposite) intensity values—as a result no fixed rule can be applied to automatically segment the characters from the LP image in both these situations.

Moreover, in most cases, commonly used multi-thresholds based character segmentation schemes alone are unable to properly segment each and every individual character of the LPs. This is because of the inefficiency of the system for segmenting characters and similar noise like components in a multi-colored environment. Stroke width filter based techniques are color invariant but are computationally expensive. Template matching and/or advanced deep learning based character segmentation and recognition schemes perform better but require high computation resulting in low FPS processing in limited hardware configuration.

The commonly used binary image feature representation schemes for character recognition are not robust against noise/distortion, even if they appear in a low level. Moreover, considering different types and sizes of alpha-numeric characters and symbols used in LPs in different countries—it is often not possible for the state-of-the-art methods to correctly recognize the characters and symbols using a unified algorithm. Therefore, there is a need to develop effective character segmentation technique capable of overcoming the above mention shortcomings.

REFERENCES

1. Methods and systems for optimized parameter selection in automated license plate recognition—U.S. Pat. No. 9,292,759 B2—Mar. 22, 2016
2. Method and system for bootstrapping an ocr engine for license plate recognition—U.S. Pat. No. 9,501,707 B2—Nov. 22, 2016
3. License plate recognition—U.S. Pat. No. 9,405,988 B2—Aug. 2, 2016
4. License plate matching systems and methods—US 2016/0299897 A1—Oct. 13, 2016
5. Leveraging character-by-character image classifiers to improve license plate state identification—U.S. Pat. No. 9,405,985 B1—Aug. 2, 2016
6. Shadow detection and removal in license plate images—US 2018/0012101 A1—January 2018
7. Iterative process for optimizing optical character recognition—U.S. Pat. No. 9,870,520 B1—January, 2018
8. Character segmenting apparatus, character recognition apparatus, and character segmenting method—U.S. Pat. No. 9,858,477 B2, January, 2018
9. Method and apparatus for performing registration plate detection with aid of edge-based sliding concentric windows—U.S. Pat. No. 9,858,493 B2, January, 2018
10. Path score calculating method for intelligent character recognition—US 2018/0005058 A1, January, 2018
11. R. Panahi et el., "Accurate Detection and Recognition of Dirty Vehicle Plate Numbers for High-Speed Applications," IEEE TRANSACTIONS ON INTELLIGENT TRANSPORTATION SYSTEMS, VOL. 18, NO. 4, APRIL 2017
12. C. Gau et al., "Vehicle License Plate Recognition Based on Extremal Regions and Restricted Boltzmann Machines," IEEE TRANSACTIONS ON INTELLIGENT TRANSPORTATION SYSTEMS, 2015
13. A. Safaei et al., "Real-time search-free multiple license plate recognition via likelihood estimation of saliency," Computers and Electrical Engineering, 2016
14. J. Wang et al., "An effective method for plate number recognition" Multimed. Tools Appl., 2017

15. M. S. Al-Shermarry, "Ensemble of Adaboost cascades of 3L-LBPs classifiers for license plates detection with low quality images" Expert Systems with Applications, 2018
16. B. Su et al., "Accurate recognition of words in scenes without character segmentation using recurrent neural network" Pattern Recognition, 2017
17. J. Matas et al. "Robust wide baseline stereo from maximally stable external regions 2008" Proc. of British Machine Vision Conference, 2002

OBJECT OF THE INVENTION

It is thus the basic object of the present invention is to develop a system and a method for real-time automatic segmentation and recognition of license plates characters of a vehicle by analysis of images of the vehicle.

Another object of the present invention is to develop a system and a method for real-time automatic segmentation and recognition of license plates characters of a vehicle by analysis of images of the vehicle which will be adapted to segment and recognize license plate characters under daylight condition without using any external light.

Another object of the present invention is to develop a system and a method for real-time automatic segmentation and recognition of license plate characters of a vehicle by analysis of images of the vehicle which will be adapted to segment and recognize license plates characters without any spatiality constraints and/or demographic considerations and/or without any restriction on jurisdiction.

Yet another object of the present invention is to develop a system and a method for real-time automatic segmentation and recognition of license plate characters of a vehicle by analysis of images of the vehicle which will be adapted to segment and recognize license plates of any type consisting of any variety of alpha-numeric characters and symbols.

A still further object of the present invention is to develop a system and a method for real-time automatic segmentation and recognition of license plates characters of a vehicle by analysis of images of the vehicle which will be adapted to filter noisy LP like localized regions to achieve high frame-per-second (FPS) throughput.

SUMMARY OF THE INVENTION

Thus according to the basic aspect of the present invention there is provided a system for automated vehicles license plates characters segmentation and recognition comprising an imaging processor connected to atleast one image grabber module or camera;

said image grabber module captures images of the vehicles and forwards it to said connected imaging processor; and said imaging processor segments and recognizes the vehicles license plates character region including the region with deformed license plates characters in the captured vehicle images by involving binarization of maximally stable external regions corresponding to probable license plate region in the captured vehicle images.

In a preferred embodiment of the present system, the imaging processor includes

LP localizer cooperating with the image grabber module or camera to receive captured images of the vehicles and localizes probable license plate region in the received images of the vehicles;

generic character segmenter connected to said LP localizer to receive the probable license plate region and separate most of non-license plate noisy regions from therefrom for segregating actual license plate regions and subsequently discarding the non-license plate noisy regions; and character segmenter connected to said generic character segmenter to receive the actual license plate regions and segmenting license plates characters including deformed license plates characters therefrom free of noisy components by involving distinguishing pixel statistics belonging to foreground and background of the actual license plate regions thus identified through maximally stable external regions.

In a preferred embodiment of the present system, the LP localizer localizes probable license plate region in the received images of the vehicles by deploying any standard License plate localization techniques based on image processing, machine learning or deep learning technology.

In a preferred embodiment of the present system, the generic character segmenter separates non-license plate noisy regions from the probable license plate region and segregates the actual license plate regions by applying different filtering criteria like number of connected components, dimensions of the connected components etc. at different steps of the presented invention.

In a preferred embodiment of the present system, the character segmenter is configured to operate on gray-scale of the actual license plate regions subjected to image enhancement schemes whereby said character segmenter involves maximally stable external regions to first crudely segment characters in the actual license plate regions covering all the characters which corresponds the foreground objects of the license plate regions along with noisy components while remaining of the license plate regions as the background object.

In a preferred embodiment of the present system, the character segmenter segments the license plates characters including deformed license plates characters therefrom free of noisy components by involving calculating pixel values belonging to the foreground and the background of the actual license plate regions and selectively converting the actual license plate regions into grey scale based on median of the pixel values for having darkish foreground and whitish background;

applying local-binarization on the gray-scale image for removing of noise component from the binarized output;

applying morphological closing operation on remaining components to get a closed image and thereby removing row-column based extra regions from the closed image to obtain mask image for discarding of noisy components therein based on the pixel values;

involving tight bound rectangle rotation to correct skew in the image and obtain a gray-scale skew corrected image and discarding the noisy components therein based on the pixel values;

applying a line fitting algorithm to remove noisy components based on bounding box information of remaining characters and applying another noise removal scheme to get the final output binary image containing all the characters properly segmented.

In a preferred embodiment of the present system, the character segmenter selectively converts the actual license plate regions into grey scale based on median of the pixel values for having darkish foreground and whitish background when the median value of the foreground pixels is greater than the median value of the background pixels.

In a preferred embodiment of the present system, the character segmenter which applies the line fitting algorithm to remove noisy components based on bounding box information of remaining characters involves minimum bounding rectangles as final ROIs to prevent discarding of the deformed characters attached to noises whereby remaining binary components which are outside the minimum bounding rectangles are discarded as noise.

According to a further aspect in the present invention, there is also provided a method for automated vehicles license plates characters segmentation and recognition involving the above system comprising involving the LP localizer cooperating with camera to receive images of the vehicles captured by said camera;

localizing probable license plate region in the received images of the vehicles by the LP localizer;

involving the generic character segmenter to receive the probable license plate region for separating most of the non-license plate noisy regions from the probable license plate region segregating actual license plate regions and subsequently discarding the non-license plate noisy regions by the generic character segmenter; and involving the character segmenter to receive the actual license plate regions and segmenting license plates characters including deformed license plates characters therefrom free of noisy components by involving distinguishing pixel statistics belonging to foreground and background of the actual license plate regions thus identified through maximally stable external regions.

BRIEF DESCRIPTION OF THE ACCOMPANYING DRAWINGS

DESCRIPTION OF THE INVENTION WITH REFERENCE TO THE ACCOMPANYING DRAWINGS

As stated hereinbefore, the present invention discloses a system and method for automated vehicles license plates characters segmentation and recognition by analyzing plurality of images of the vehicles in real-time under day-light condition without using any external light. In one embodiment, the system can work without any spatiality constraints and/or demographic considerations without any restriction on jurisdiction and can effectively segment and subsequently recognize characters of the license plates (LPs) of any type consisting of any variety of alpha-numeric characters and symbols. In other embodiment, methods for filtration of noisy LP like localized regions to achieve high frame-per-second (FPS) throughput are described. In another embodiment, a dual-binarization scheme is described for color invariant LP segmentation.

It is, therefore, one aspect of the disclosed embodiments to provide a method and system for License plate (LP) recognition.

It is, therefore, one aspect of the disclosed embodiments to provide a novel image thresholding technique based on character-bounding box information applied on top of multi-threshold binarization output.

It is, therefore, one aspect of the disclosed embodiments to provide a computationally efficient multi-level hierarchical technique for character segmentation from texts spanning different scripts and color combinations.

Figure 1:
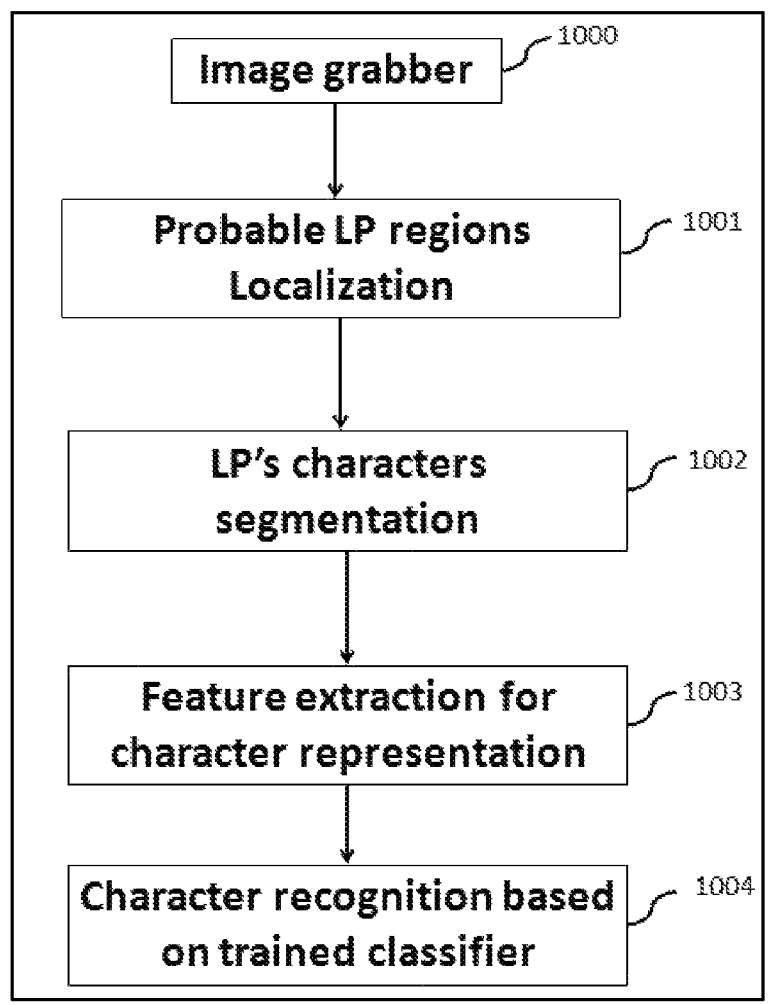
FIG. 1 depicts the overall block diagram of the system and modules implemented in accordance with the disclosed embodiments regarding the generic ALPR.

Reference is now invited from the accompanying FIG. 1 which depicts the overall block diagram of a generic ALPR system in accordance with the present invention. As shown in FIG. 1, the Image grabber module [1000] can be any input image/video (plurality of images) source. The image grabber module [1000] is basically a traffic surveillance camera configured to capture images of the traffic or vehicles.

The images of the vehicle as captured by the image grabber module [1000] are then forwarded to a connected imaging processor for automated segmentation and recognition of vehicles license plates character region in the captured vehicle images. The imaging processor includes a vehicle License Plate (LP) localizer [1001], a generic LP characters segmenter [1002] and a character segmenter [1003].

The vehicle License Plate (LP) localizer [1001] is provided for detecting probable LP regions in the images of the vehicle including detecting multi-colored, multi-textured LP regions. The LP localizer [1001] is capable of localizing both single rowed and multi-rowed LP regions. Based on the disclosed embodiments, the image region of the images of the vehicles corresponding to localized LP as produced by the LP localizer is forwarded to the generic LP characters segmenter [1002]. The generic LP characters segmenter [1002] is provided for separating most of non-license plate noisy regions from the actual license plate regions and subsequently discarding the non-license plate noisy regions. The next module is character segmenter [1003] which is basically a feature vector extraction module for segmenting characters of the LP free of noisy components by involving various distinguishing pixel statistics belonging to foreground and background of the actual license plate regions. The segmented characters are recognized in character recognition module [1004] by a previously trained classifier (ML/DL).

Figure 2:
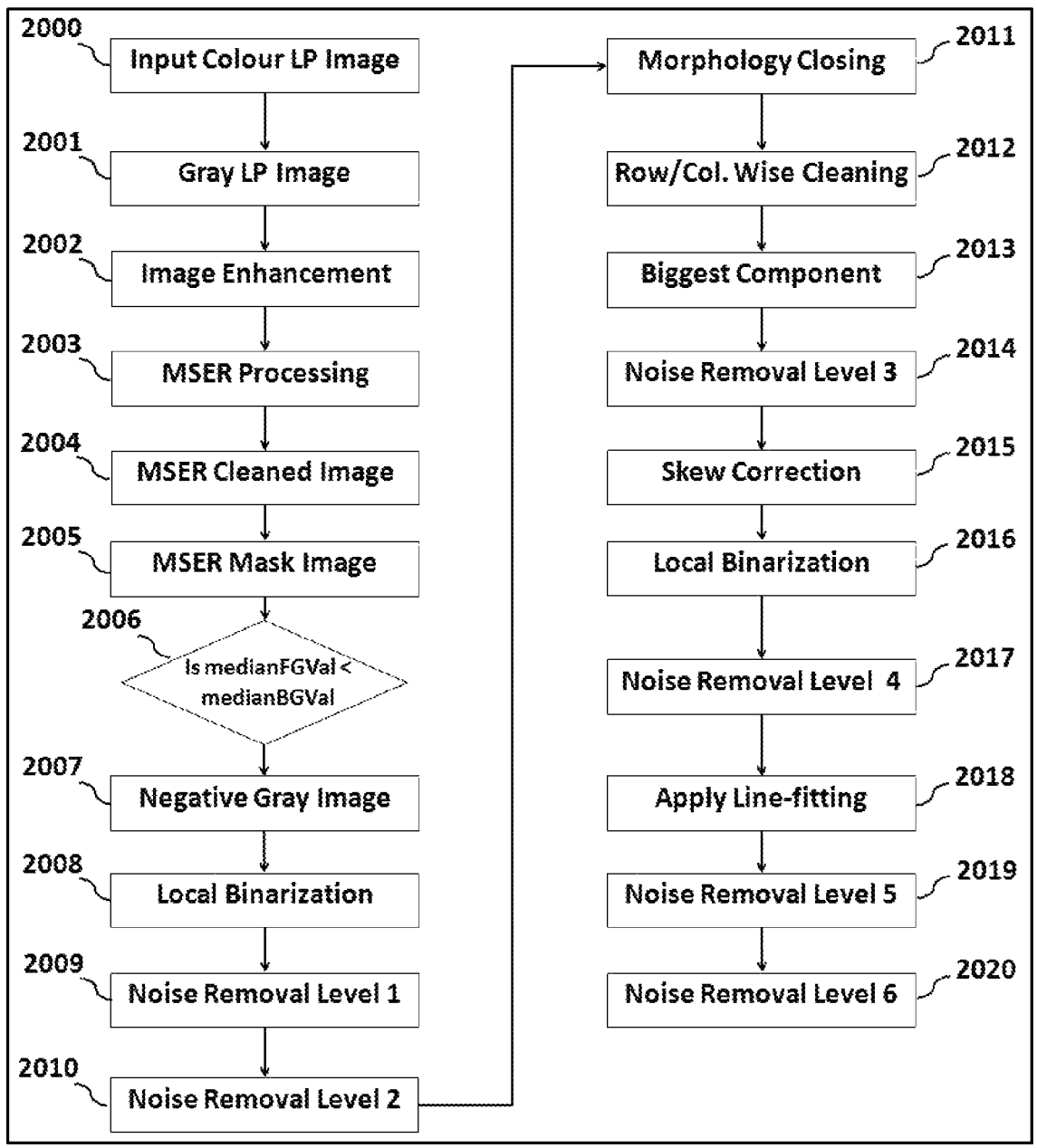
FIG. 2 depicts the overall block diagram of the system and or module implemented in accordance with the disclosed embodiments regarding the generic character segmentation.
Figure 3:
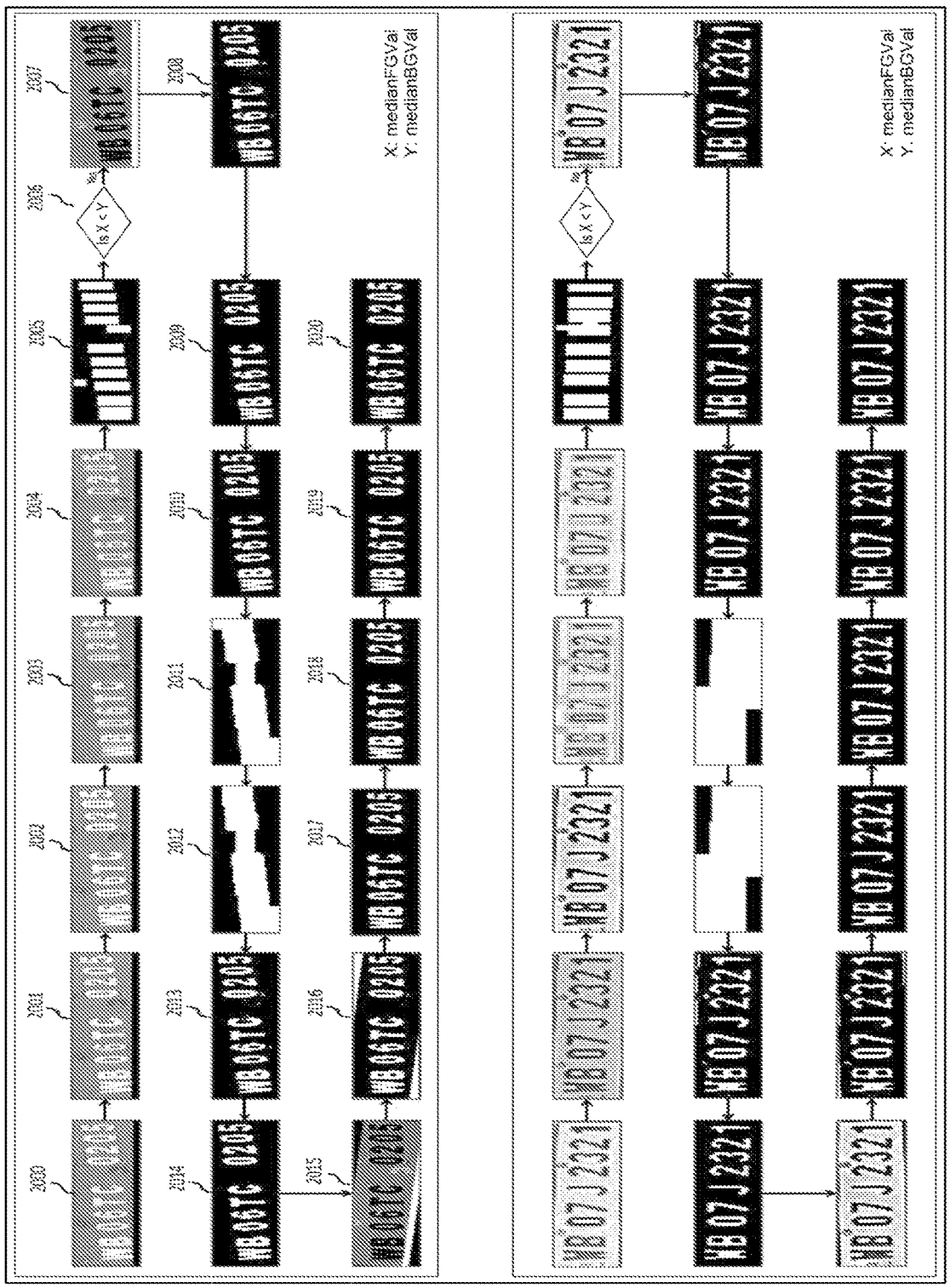
FIG. 3 shows supporting examples of various steps of the generic character segmentation system/method.

The accompanying FIG. 2 depicts the details of the disclosed generic characters segmenter [1002]. Similarly, FIG. 3 shows supporting examples of various steps of the generic character segmentation method. The input [2000] (FIG. 2, FIG. 3) is the color LP image region of the original image localized by the LP localizer module [1001] as the probable LP regions. It might be the case that the LP localizer module [1001] detects some regions of the original image which are actually not LP regions. The generic character segmenter [1002] separates most of the non-LP noisy regions from the actual LP regions produced by the LP localizer module [1001]. The generic character segmenter [1002] is capable of identifying non-LP noisy regions and subsequently discarding the same at different steps of processing.

The proposed character segmenter works on gray-scale image [2001] (FIG. 2, FIG. 3) of the LP region. Many state-of-the-art character segmentation schemes use color information as a cue for segmentation of the characters. This often causes improper segmentation results as color is very much dependant on environmental conditions—such that a LP with color plate depending on the environmental might looks different at different time. Moreover, for effective night-time ALPR, usage of infra-red (IR) has become prevalent—and as a result only gray-scale image is available for processing. The gray-scale image might need to go under some image enhancement schemes [2002] as shown in FIG. 2 and FIG. 3.

In [2003] (FIG. 2, FIG. 3), maximally stable external regions (MSER) is used in the character segmenter [1003] to first crudely segment characters in the LP. MSER has the benefit of being invariant to color of the objects as it uses multi-thresholds binarization. But MSER suffers from the problem that it often produces improper multiple segmentation for a single character. The MSER based binarization scheme is now explained with the help of the FIG. 1a.

Figure 1A:
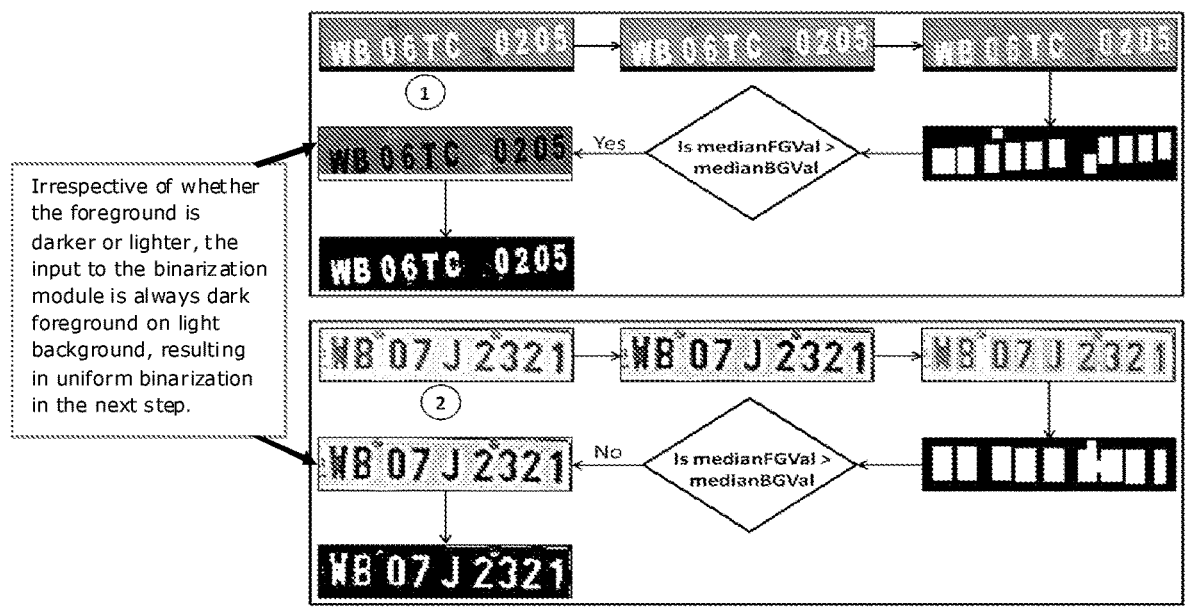
FIG. 1a shows MSER based binarization scheme.

The FIG. 1a shows the same example which is previously discussed in the earlier article. To explain the procedure clearly, some processing steps are not shown, though they are necessary and part of the proposed system. In example, the LP contains whitish characters (foreground) and darkish LP background. MSER is used to find the bounding boxes covering components of this LP. It can be seen from the FIG. 1a that MSER is covering all the characters along with some noisy components. Because for a true LP—MSER covered boxes will associate mostly with true characters. In other words, MSER will cover mostly the foreground objects (characters). Now considering MSER covered boxes as foreground objects and remaining of the LP as background, some statistics (like median value) of the pixels are calculated. If the LP contains whitish foreground and darkish background (like the given example) then the value of the median value for foreground is going to be higher than that of the background region. For example, in the FIG. 1a for the first LP the median value calculated from the MSER covered foreground pixels is found to be 240 (indicating whitish characters/foreground) and the median value of the background pixels is obtained as 140 (indicating darkish background). For the second LP (example 2) in the FIG. 1a, these values are 40 (indicating darkish characters/foreground) and 170 (indicating whitish background), respectively. Therefore, based on these statistics it can be decided how to proceed further. For example, for the first LP (containing whitish characters and darkish background) the grayscale image is reversed to get the negative image in which characters are darkish and background become whitish compared to the foreground. For the second LP, this inversion is not necessary as characters in this LP are already darkish and background is whitish. In the next step of the system, binarization technique is applied to segment the characters from the background plate. As the binarization scheme works properly for darkish foreground objects and whitish background plate—in both the binarization outputs—characters are represented always by white and background by black value.

In the character segmenter, based on different criteria like dimensions of the segmented components, positions of the segmented components etc. some of the bounding-boxes identified by MSER are discarded [2004] (FIG. 2, FIG. 3) from further processing. Based on the remaining MSER detected bounding-boxes a mask image [2005] (FIG. 2, FIG. 3) is produced. The assumption is that most of the character-like components (foreground) in the probable LP region will get separated from the plate (background) by MSER. In [2005] (FIG. 2, FIG. 3), white portions shows probable character-like components and black portions shows probable background regions.

Using the extracted information some representative statistics (like medians) of the pixel values belonging to foreground and background are calculated in the character segmenter. It is to be noted, (and as can be seen from the given examples of FIG. 3) that for a LP having whitish (higher pixel value) foreground (characters) and blackish (lower pixel value) background the median value of the foreground pixels will be greater than the median value of the background pixels. The reverse will be true for a LP having darkish (lower pixel value) foreground (characters) and blackish (lower pixel value) background. Therefore, this simple statistic can be used to understand the nature of the LP's foreground and background color combination. In [2006] (FIG. 2, FIG. 3), based on the median values of the foreground and background pixel values, decision is taken to invert the gray-values of the image [2007] (FIG. 2, FIG. 3) (first LP example of FIG. 3) for whitish foreground and darkish background color combination. Gray-values of the regions with darkish foreground and whitish background color combination are not inverted (as shown in the second LP example of FIG. 3).

In [2008] (FIG. 2, FIG. 3), local-binarization scheme (like Sauvola, Bradley etc.) is applied on the gray-scale image of [2007]. Based on different criteria, several levels of noise removal schemes are applied [2009] [2010] on the binarized output of [2008]. Several levels of noise removal schemes are useful to gradually removing noisy components. For examples, in the first level [2009], too-small or too-large components are removed. Assuming that for a true LP region, characters will be of approximately similar height. Therefore, in the second layer of noise removal [2010] median height and width of the remaining components can be used to remove noisy components further.

The character segmenter then applies a morphological closing operation on the remaining components to get a closed image [2011] (FIG. 2, FIG. 3). Some form of row-column based extra regions removal scheme is applied on the closed image [2012] (FIG. 2, FIG. 3). This is helpful when the LP localizer [1001] output a region as probable LP which contains extra portions along with the actual LP. In this situation, [2012] (FIG. 2, FIG. 3) provides facility to split the actual LP from these extra noisy portions. Assuming for a true LP region, after applying row-column wise cleaning mechanism [2012] (FIG. 2, FIG. 3) the biggest component will be the actual LP region. In [2014] (FIG. 2, FIG. 3), this biggest component is identified which can be processed further and rest of the portions are discarded. Considering the output of [2012] (FIG. 2, FIG. 3) as a mask image, only the components from the binarization output of [2008] (FIG. 2, FIG. 3) is input to [2013] (FIG. 2, FIG. 3). Using the statistics already computed in [2009] [2009] (FIG. 2, FIG. 3), noisy components of [2013] (FIG. 2, FIG. 3) are discarded to get [2014] (FIG. 2, FIG. 3).

Using the concept of tight bound rectangle rotation—the skew in the image is corrected to get a gray-scale skew corrected image [2015] (FIG. 2, FIG. 3). The skew-corrected gray-scale image is local-binarized to get [2016] (FIG. 2, FIG. 3). Using the statistics already computed in [2009] [2009] (FIG. 2, FIG. 3), noisy components of [2016] (FIG. 2, FIG. 3) are discarded to get [2017] (FIG. 2, FIG. 3).

Figure 3A:
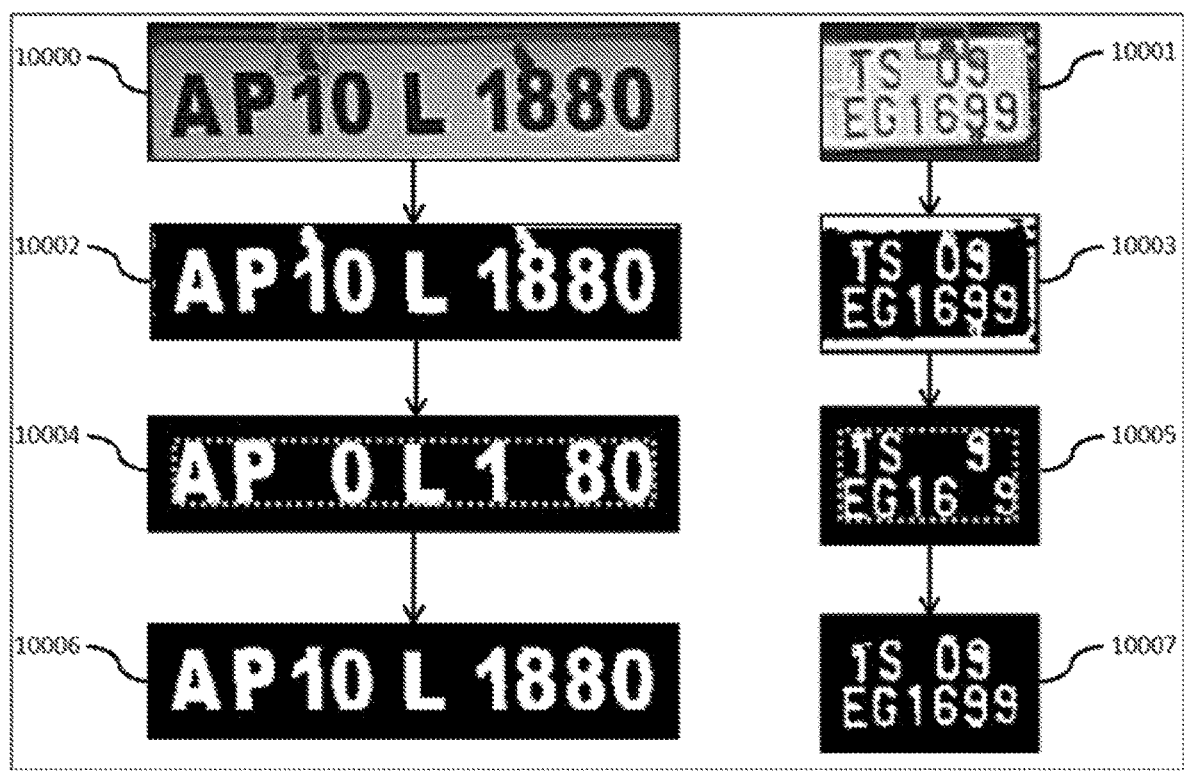
FIG. 3a shows Line-fitting technique for noise removal.

In [2018] (FIG. 2, FIG. 3), a line fitting algorithm is used in the character segmenter to remove noisy components based on the bounding box information of the remaining characters. This is very much useful for removing screw/noise like components often found attached to characters of the LP—which makes the correct recognition of the characters often difficult. In [2019], another noise removal scheme is applied to get the final output binary image [2020]—which contains all the characters properly segmented. The line-fitting procedure to remove noisy components based on the bounding box information of the remaining characters is explained with the help of the FIG. 3a.

Two different LP's images are used to describe the line-fitting noise removal procedure. One of the LP [10000] is a single row LP of a 4-wheeler and the other [10001] is two-row LP of a 2-wheeler. As can be seen from the given example images that in both the LPs, some characters (1 and 8 in [10000]; 0 and 9 in [10001]) are not in proper form/shape. In both the cases the characters' shapes are distorted because of the existence of some noise (image of screw-tops or similar)—some of them are shown by "red rectangles" in the FIG. 3a. [10002] and [10003] show the output after applying binarization technique on the input images. It is clear from [10002] and [10003] that due to the existence of noise attached to some characters of the LPs—binarization output cannot be used directly for further processing, e.g. they cannot be sent to OCR engines to recognize the characters. Therefore, noise removal schemes of some form based on different statistics (like median height, median width of connected components, etc) are calculated and applied on the binarized images (10002 and 10003) to get images [10004] and [10005].

However, it can be seen that due to existence of the noisy regions the deformed characters gets removed in [10004] and [10005]. Based on the remaining components' bounding boxes information—horizontal and vertical lines are fitted to find bounding rectangles which are shown by "green dashed lines" in [10004] and [10005]. Considering these minimum bounding rectangles' as the final ROIs—Binary components which got lost in the [10004] and [10005] are brought back to their original positions. Remaining binary components which are outside the minimum bounding rectangles are discarded as noise.

We claim:

1. A system for automated vehicles license plates characters segmentation and recognition comprising
    an imaging processor connected to at least one image grabber module or camera; said image grabber module captures images of the vehicles and forwards it to said connected imaging processor; and
    wherein the imaging processor is configured to (i) localize probable license plate region in the received images of the vehicles, (ii) separate non-license plate noisy regions from said license plate region and discard the non-license plate noisy regions for obtaining actual license plate region and (iii) segment the license plates characters including deformed license plates characters from the actual license plate region by including
        calculating pixel values belonging to foreground and background of the actual license plate region and selectively converting the actual license plate region into grey scale based on median of the pixel values for having darkish foreground and whitish background;
        applying local-binarization on the gray-scale image for removing of noise component from the binarized output;
        applying morphological closing operation on remaining components to get a closed image and thereby removing row-column based extra regions from the closed image to obtain mask image for discarding of noisy components therein based on the pixel values;
        involving tight bound rectangle rotation to correct skew in the image and obtain a gray-scale skew corrected image and discarding the noisy components therein based on the pixel values; and
        applying a line fitting algorithm to remove noisy components based on bounding box information of remaining characters and applying a noise removal scheme to get final output binary image containing all the characters properly segmented.

2. The system as claimed in claim 1, wherein the imaging processor localizes probable license plate region in the received images of the vehicles by deploying an image processing based license plate localization technique.

3. The system as claimed in claim 1, wherein the imaging processor separates non-license plate noisy regions from the probable license plate region and segregates the actual license plate regions by applying filtering criteria based on number and dimensions of the character components in the license plate.

4. The system as claimed in claim 1, wherein the imaging processor involves maximally stable external regions to first crudely segment the characters in the actual license plate regions covering all the characters which corresponds the foreground objects of the license plate regions along with noisy components while remaining of the license plate regions as the background object.

5. The system as claimed in claim 1, wherein the imaging processor selectively converts the actual license plate regions into grey scale based on median of the pixel values for having the darkish foreground and the whitish background when the median value of the foreground pixels is greater than the median value of the background pixels.

6. The system as claimed in claim 1, wherein the imaging processor which applies the line fitting algorithm to remove noisy components based on bounding box information of remaining characters involves minimum bounding rectangles as final ROIs to prevent discarding of the deformed characters attached to noises whereby remaining binary components which are outside the minimum bounding rectangles are discarded as noise.

7. A method for automated vehicles license plates characters segmentation and recognition involving the system as claimed in claim 1 comprising
    involving the imaging processor cooperating with camera to receive images of the vehicles captured by said camera;
    localizing probable license plate region in the received images of the vehicles;
    involving the imaging processor for separating most of the non-license plate noisy regions from the probable license plate region
    segregating actual license plate regions and subsequently discarding the non-license plate noisy regions by the imaging processor; and
    involving the imaging processor to receive the actual license plate regions and segmenting license plates characters including deformed license plates characters therefrom free of noisy components by involving distinguishing pixel statistics belonging to foreground and background of the actual license plate regions thus identified through maximally stable external regions.

* * * * *